United States Patent
Bosse et al.

(10) Patent No.: US 9,146,315 B2
(45) Date of Patent: Sep. 29, 2015

(54) THREE DIMENSIONAL SCANNING BEAM SYSTEM AND METHOD

(75) Inventors: Michael Bosse, Brisbane (AU); Robert Zlot, Brisbane (AU)

(73) Assignee: COMMONWEALTH SCIENTIFIC AND INDUSTRIAL RESEARCH ORGANISATION, Campbell, Australian Capital Territory (AU)

( * ) Notice: Subject to any disclaimer, the term of this patent is extended or adjusted under 35 U.S.C. 154(b) by 0 days.

(21) Appl. No.: 13/811,982

(22) PCT Filed: Jul. 26, 2010

(86) PCT No.: PCT/AU2010/000939
§ 371 (c)(1),
(2), (4) Date: Jan. 24, 2013

(87) PCT Pub. No.: WO2012/012819
PCT Pub. Date: Feb. 2, 2012

(65) Prior Publication Data
US 2013/0120736 A1 May 16, 2013

(51) Int. Cl.
*G01S 17/08* (2006.01)
*G01S 13/08* (2006.01)
(Continued)

(52) U.S. Cl.
CPC .............. *G01S 17/08* (2013.01); *G01S 7/4817* (2013.01); *G01S 13/08* (2013.01); *G01S 15/08* (2013.01); *G01S 17/42* (2013.01); *G01S 17/89* (2013.01); *G01S 17/936* (2013.01)

(58) Field of Classification Search
CPC ............. G01C 3/08; G01P 3/36; G01S 17/32; G01S 17/936
USPC ............. 356/3.01–3.15, 4.01–4.1, 5.01–5.15, 356/6–22, 28, 28.5
See application file for complete search history.

(56) References Cited

U.S. PATENT DOCUMENTS 5,118,180 A * 6/1992 Wichmann et al. .......... 356/5.05
6,694,233 B1   2/2004 Duff et al.
(Continued)

FOREIGN PATENT DOCUMENTS

CN   2080164 U   7/1991
CN   1367886 A   9/2002
(Continued)

OTHER PUBLICATIONS

Bosse, Michael and Zlot, Robert, "Continuous 3D Scan-Matching with a 2D Spinning Laser," Proceedings of the IEEE International Conference on Robotics and Automation, pp. 4312-4319, Kobe, Japan, May 12-17, 2009.
(Continued)

*Primary Examiner* — Luke Ratcliffe
(74) *Attorney, Agent, or Firm* — Stephen T. Olson; Harness, Dickey & Pierce, P.L.C.

(57) ABSTRACT

A three dimensional scanning beam system (100) and method (500) enable economical and efficient three dimensional scans of an environment. The system (100) includes a ranging apparatus (105), and a reactive linkage mechanism (110) having a first end (115) and a second end (120). The first end (115) is connected to the ranging apparatus (105) and the second end (120) is connected to an object (125) that moves the system (100) through an environment. In use acceleration of the object (125) with respect to the environment is converted by the reactive linkage mechanism (110) to motion of the ranging apparatus (105) with respect to the object (125), which increases the field of view of the ranging apparatus (105) with respect to the environment.

20 Claims, 7 Drawing Sheets

(51) Int. Cl.
*G01S 15/08* (2006.01)
*G01S 17/42* (2006.01)
*G01S 17/89* (2006.01)
*G01S 7/481* (2006.01)
*G01S 17/93* (2006.01)

(56) References Cited

U.S. PATENT DOCUMENTS

| | | | |
|---|---|---|---|
| 6,862,084 | B2 | 3/2005 | Nagata et al. |
| 7,359,827 | B2 | 4/2008 | Shigematsu |
| 2006/0017912 | A1* | 1/2006 | Egawa .................. 356/4.03 |
| 2008/0078262 | A1* | 4/2008 | Murata et al. .................. 74/126 |
| 2010/0020074 | A1 | 1/2010 | Taborowski et al. |
| 2011/0194098 | A1* | 8/2011 | Goto .................. 356/4.01 |

FOREIGN PATENT DOCUMENTS

| | | |
|---|---|---|
| EP | 0444402 A2 | 9/1991 |
| EP | 2 199 828 A2 | 6/2010 |
| JP | H8-123206 | 5/1996 |
| JP | 2002-116023 | 4/2002 |
| JP | 2005-127971 | 5/2005 |
| JP | H2006-119420 | 5/2006 |
| JP | 2010-510559 | 4/2010 |
| WO | WO-2010/032495 A1 | 3/2010 |

OTHER PUBLICATIONS

International Search Report for PCT/AU2010/000939, mailed Jan. 5, 2011; ISA/AU.

First Chinese Office Action for parallel Application CN 201080069024.2, mailed Nov. 24, 2014, with English translation thereof.

Japanese Office Action for parallel application JP 2013-520923, mailed Apr. 1, 2014, with English translation thereof.

Japanese Notice of Decision of Refusal for parallel application JP 2013-52093, mailed Jan. 20, 2015.

* cited by examiner

THREE DIMENSIONAL SCANNING BEAM SYSTEM AND METHOD

CROSS-REFERENCE TO RELATED APPLICATIONS

This application is a 371 U.S. National Stage of International Application No. PCT/AU2010/000939, filed on Jul. 26, 2010, the disclosure of which is herein incorporated by reference in its entirety.

FIELD OF THE INVENTION

The present invention relates generally to scanning beam systems. In particular, although not exclusively, the invention relates to a system and method for three dimensional (3D) scanning using a reactive linkage mechanism.

BACKGROUND OF THE INVENTION

Vehicles, people or robots that operate in environments where no a priori map is available often must construct a map in order to function and adapt to their working environment, or to provide accurate models for an end user. Mapping and localization, including simultaneous localization and mapping (SLAM), are fundamental problems in mobile robotics, and include scenarios in which a moving object with no known map or accurate measure of its pose must estimate and maintain both.

The pose of an object refers to its position and orientation in space. Accurate knowledge of the pose of moving objects is often important for mobile tasks such as robot navigation, mapping, and planning. In particular, it is well known that in some environments conventional navigation systems cannot operate or are not practical. For example, in environments such as inside buildings, in underground mines, or in deep water, satellite-based global positioning system (GPS) technologies and cellular-based positioning technologies are often inoperative. If a detailed map of such an environment is not available, vehicles, people or robots operating in the environment may need to rely on alternative navigations systems, such as SLAM systems, which may include inertial measurement units (IMUs) or other sensors to determine position and orientation.

3D scanning beam systems can provide data for mapping and/or localization applications. Generally, such systems include an active, powered linkage mechanism that moves a sensor in multiple degrees of freedom, effectively increasing the field of view of the sensor, to obtain a 3D scan. For example some systems may include a laser ranging apparatus that outputs a one dimensional beam. If the ranging apparatus is mounted to a powered multiple-degree-of-freedom linkage or powered gimbal mechanism, the laser can be repetitively swept through a three dimensional space, such as a space in front of a vehicle. Data collected from the apparatus then can be used to define a 3D "point cloud", which effectively defines an image or map of an environment. Other ranging apparatus can include two dimensional laser scanners that are rotated about a central axis, or moved in a third dimension when fixed to a vehicle, to define a 3D point cloud. Further, 3D flash light detection and ranging (LIDAR) apparatuses can incorporate multiple detectors in parallel to generate 3D ranging data.

In many cases 3D scanning beam systems are rigidly mounted to a vehicle or robot, and continuously scan a particular region relative to an orientation of the vehicle or robot. Collected data then can be used for mapping and/or localization applications or more basic object detection and scene awareness purposes. However, in some circumstances errors can be introduced to a rigidly mounted scanning beam system due to vibrations or jouncing of a vehicle or robot to which the system is attached. Therefore complex vibration isolation and stabilisation systems have been devised to effectively isolate 3D scanning beam systems from unwanted vibrations or movement.

In some applications the required hardware necessary to increase the field of view of a scanning sensor to effectively scan a three dimensional region can be prohibitively complex and expensive. Therefore, there is a need for an improved 3D scanning beam system and method.

OBJECTS OF THE INVENTION

It is an object of some embodiments of the present invention to provide consumers with improvements and advantages over the above described prior art, and/or overcome and alleviate one or more of the above described disadvantages of the prior art, and/or provide a useful commercial choice.

SUMMARY OF THE INVENTION

Accordingly, in one form, the present invention is a three dimensional scanning beam system, comprising:
  a ranging apparatus; and
  a reactive linkage mechanism having a first end and a second end, wherein the first end is connected to the ranging apparatus and the second end is connected to an object that moves the system through an environment;
  whereby in use acceleration of the object with respect to the environment is converted by the reactive linkage mechanism to motion of the ranging apparatus with respect to the object, which increases a field of view of the ranging apparatus with respect to the environment.

Optionally, the system further comprises an orientation sensor attached to the ranging apparatus.

Optionally, the system further comprises a computer system operatively coupled to the ranging apparatus, wherein the computer comprises a computer readable medium that stores program code components defining a registration algorithm, and wherein the registration algorithm processes data from the ranging apparatus to define a 3D point cloud of the environment.

Optionally, the ranging apparatus comprises a laser.

Optionally, the laser comprises a two dimensional scanning beam laser.

Optionally, the 3D point cloud is defined in real time.

Optionally, the ranging apparatus transmits and receives at least one of the following types of signals: light signals, acoustic signals, ultrasonic signals, radio frequency signals, gamma radiation signals, microwave signals.

Optionally, the reactive linkage mechanism comprises a spring.

Optionally, the orientation sensor comprises an inertial measurement unit (IMU).

Optionally, a connection between the first end of the reactive linkage mechanism and the ranging apparatus is a fluidic coupling.

According to another form, the present invention is a method for obtaining a three dimensional scan of an environment, the method comprising:
  connecting a ranging apparatus to a first end of a reactive linkage mechanism;
  connecting a second end of the reactive linkage mechanism to an object;

moving the object through the environment, whereby acceleration of the object is converted by the reactive linkage mechanism to motion of the ranging apparatus with respect to the object, which increases the field of view of the ranging apparatus with respect to the environment; and obtaining data by the ranging apparatus that defines the three dimensional scan of the environment.

Optionally, the method further comprises:

operatively coupling a computer system to the ranging apparatus, wherein the computer system comprises a computer readable medium that stores program code components defining a registration algorithm; and processing the data using the computer system, whereby the registration algorithm defines a 3D point cloud of the environment.

Further features and advantages of the present invention will become apparent from the following detailed description.

BRIEF DESCRIPTION OF THE DRAWINGS

To assist in understanding the invention and to enable a person skilled in the art to put the invention into practical effect, preferred embodiments of the invention will be described by way of example only with reference to the accompanying drawings, in which.

DETAILED DESCRIPTION OF THE INVENTION

The present invention relates to a 3D scanning beam system and method. By attaching the system to an object, such as a vehicle, robot, person or animal, 3D scans of an environment can be obtained economically and reliably. Data from the 3D scans then can be used for various purposes such as object detection, proximity detection, mapping, localization, or collision avoidance.

In this patent specification, adjectives such as first and second, left and right, top and bottom, etc., are used solely to define one element or method step from another element or method step without necessarily requiring a specific relative position or sequence that is described by the adjectives. Words such as "comprises" or "includes" are not used to define an exclusive set of elements or method steps. Rather, such words merely define a minimum set of elements or method steps included in a particular embodiment of the present invention.

Figure 1:
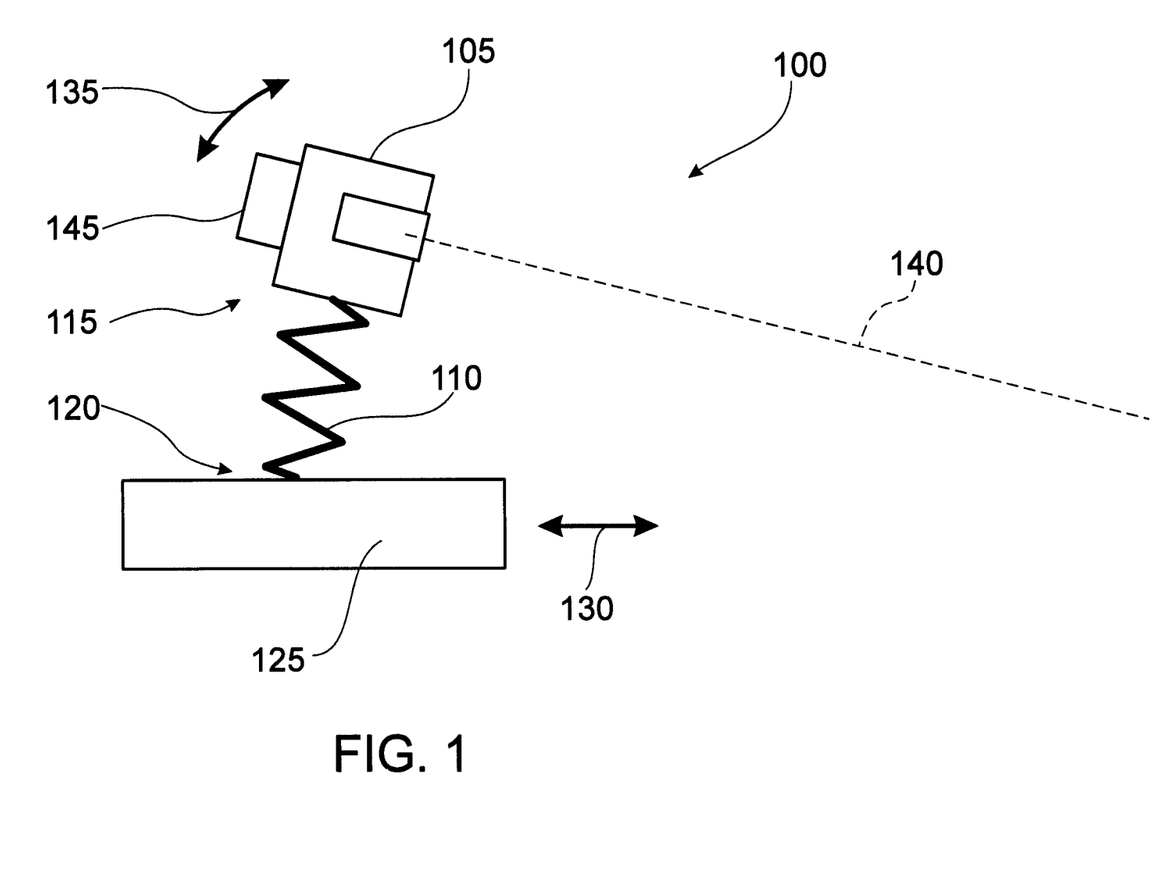
FIG. 1 is a schematic diagram illustrating a side view of a 3D scanning beam system, according to an embodiment of the present invention.

Referring to FIG. 1, a schematic diagram illustrates a side view of a 3D scanning beam system 100, according to an embodiment of the present invention. The system 100 includes a ranging apparatus in the form of a 2D laser beam scanner 105, and a reactive linkage mechanism in the form of a coil spring 110. A first end 115 of the coil spring 110 is connected to the 2D laser beam scanner 105. A second end 120 of the coil spring 110 is connected to an object 125. Translational acceleration (as indicated by arrows 130) of the object 125 is then converted by the reactive linkage mechanism to rotational motion (as indicated by arrows 135) of the 2D laser beam scanner 105.

The 2D laser beam scanner 105 is thus able to significantly increase its field of view and scan an environment in front of the object 125 in 3D. No independently powered gimbal mechanisms or other independent excitation source is required to produce the rotational motion of the 2D laser beam scanner 105. The system 100 thus can be economical and effective where cost or spatial constraints place limits on the hardware required to scan an environment using a ranging apparatus.

According to some embodiments of the present invention, an optional orientation sensor, such as an inertial measurement unit (IMU) 145, camera, magnetometer or other device, may be attached to the ranging apparatus. Such an orientation sensor can assist in processing data from the ranging apparatus in applications where data defining the position or orientation of the ranging apparatus is required.

Figure 2:
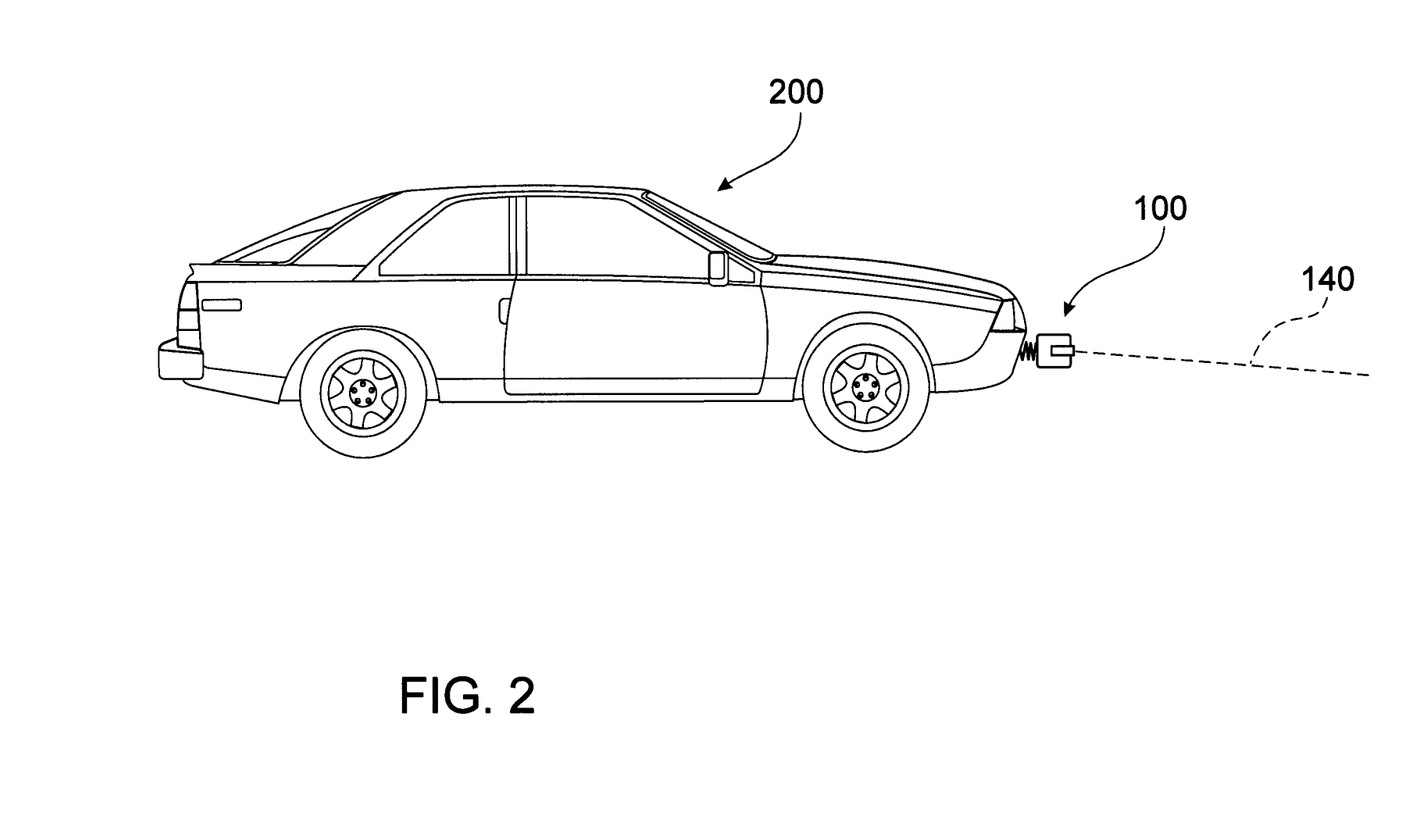
FIG. 2 is a schematic diagram illustrating a side view of the system of FIG. 1 connected to a front end of an automobile.

Referring to FIG. 2, a schematic diagram illustrates a side view of the system 100 connected to a front end of an automobile 200. The object 125 is thus replaced by the automobile 200. Translational acceleration of the automobile 200 is converted to rotational motion of the 2D laser beam scanner 105, enabling a region in front of the automobile 200 to be scanned in 3D. Other naturally occurring accelerations of the automobile 200 during normal use, such as jounce (i.e., up and down) accelerations and turning accelerations, can assist in exciting rotational motion of the 2D laser beam scanner 105. As will be understood by those having ordinary skill in the art, forces and torques applied to the object 125 induce motion (primarily rotational motions, but also small translational motions) of the scanner 105 relative to the object 125. The result is amplified motion of the scanner 105 relative to an environment that is being scanned.

2D laser beam scanners such as the scanner 105 are widely available commercially, or can be readily manufactured using commercially available components. For example, the scanner 105 can comprise a light detection and ranging (LIDAR) laser measurement sensor (LMS) model 291, manufactured by SICK AG. Alternatively, various other types of ranging apparatus can be used, including for example those that use various types of radiation or signals such as light signals, acoustic signals, ultrasonic signals, radio frequency (RF) signals, gamma radiation signals, or microwave signals. Such radiation or signals can be used in a wide variety of ranging techniques including, for example, time-of-flight (TOF), frequency modulation continuous wave (FMCW), triangulation and phase shift ranging techniques. Also, a ranging apparatus according to the present invention does not need to scan in 2D, but could for example be a simple one dimensional beam ranging apparatus. Rotation of such a one dimensional beam ranging apparatus can also provide an effective 3D scan of an environment.

According to some embodiments of the present invention the reactive linkage mechanism also can comprise various types of commercially available off the shelf (COTS) products or custom made products. For example, the coil spring 110 can comprise various types of coil springs made of various materials, including polymers and metal alloys. Further, a reactive linkage mechanism can comprise other elements such as multiple springs or spring-like materials connected to a ranging apparatus. As will be understood by those having ordinary skill in the art, and in light of the present disclosure, various other types of elastic connection mechanisms, including for example simple elastic rods, inflated balloons, sponges, rubber, etc., can be used to provide a reactive linkage mechanism that converts accelerations of an object to motion of a ranging apparatus.

Further, those skilled in the art will appreciate that a reactive linkage mechanism according to the present invention can also act as a passive mechanical filter that isolates the scanner 105 from high-frequency motion of the object 125. The reactive linkage mechanism, such as the coil spring 110, can be tuned both to resonate at particular frequencies to meet application requirements, and to suppress high-frequency motions that can be problematic. For example, some high-frequency motions may complicate processing by registration algorithms or may be damaging to the scanner 105.

Further, the reactive linkage mechanism can be tuned so that an impulse response of the scanner 105 is lengthened based on time constants associated with the hardware; effectively enabling the scanner 105 to continue moving for a period of time after the object 125 has stopped moving. Thus the reactive linkage mechanism can store energy (such as mechanical or gravitational energy) and release it slowly over time.

Still other embodiments of the reactive linkage mechanism can include dampers or other physical limiters of the range of motion available to the mechanism. That can be useful, for example, to limit a field of view of the scanner 105 to a range of interest for a specific application.

Figure 3:
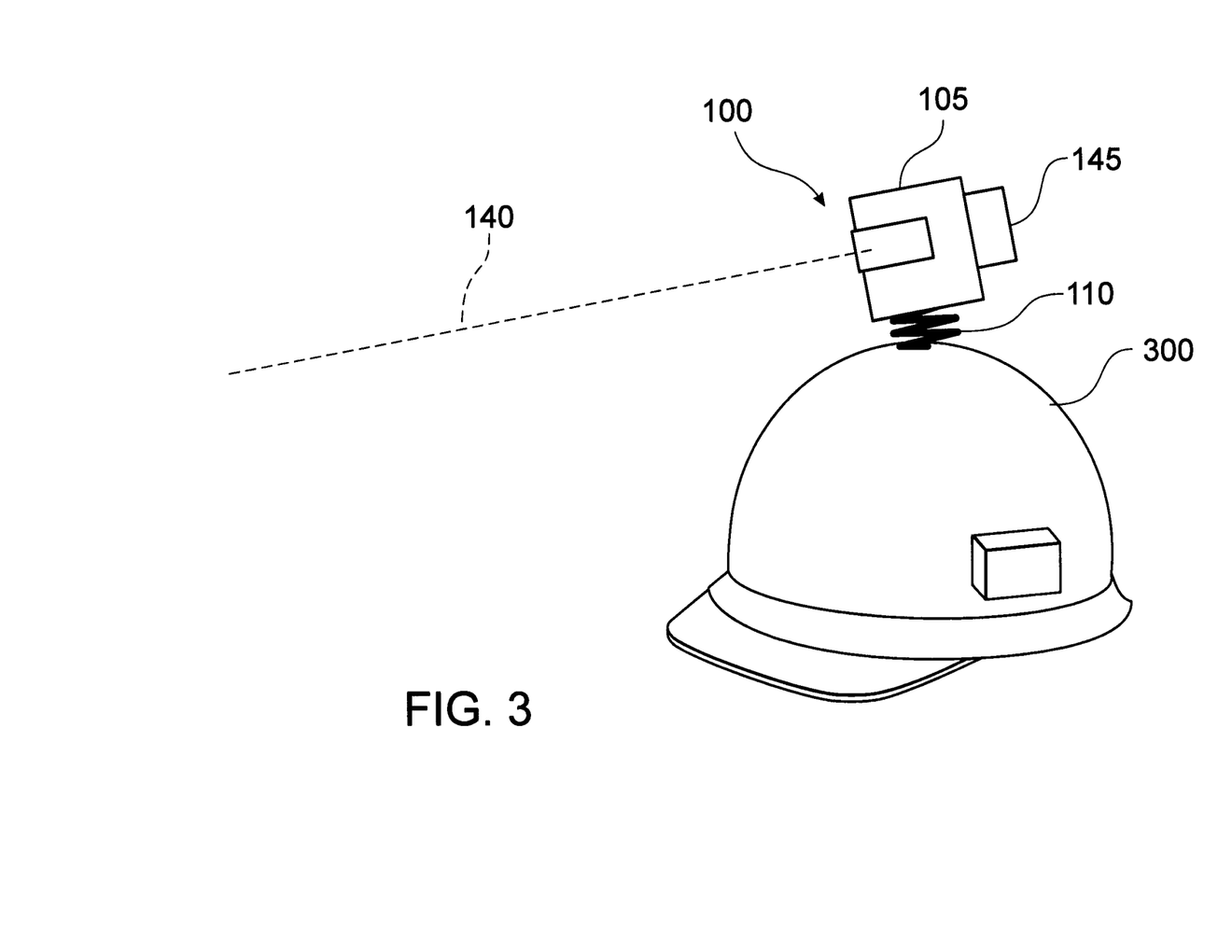
FIG. 3 is a schematic diagram illustrating a side view of the system of FIG. 1 connected to a top of a construction safety helmet.

Referring to FIG. 3, a schematic diagram illustrates a side view of the system 100 connected to a top of a construction safety helmet 300. According to this embodiment, walking, nodding or other natural movements of a worker's head while wearing the helmet 300 can be adequate to excite rotational motion of the 2D laser beam scanner 105. The system 100 thus can be used to effectively scan a work site immediately in front of a worker, such as inside a building, in an underground mine, or in various other environments.

The system 100 as illustrated in FIG. 3 may be designed to use very little power, as no motors or other powered mechanisms are necessary to excite scanning or rotational motion of the ranging apparatus. Thus the ranging apparatus can be powered by only a relatively low power battery needed to supply power to, for example, solid state circuitry of the ranging apparatus.

Some embodiments of the present invention may be used to provide scanning data to a computer system. The computer system may then process the data using a registration algorithm to define a 3D point cloud. As known to those having ordinary skill in the art, such a 3D point cloud can be used for various mapping and/or localization applications or imaging applications.

A system such as the system 100 thus may be used in various applications. For example, in the field of mapping, the system 100 can be mounted on a moving platform, such as a vehicle, push-cart, human or animal and can be used to obtain 3D maps of an environment. In robotics applications the system 100 can be used for terrain mapping or general scene awareness. As illustrated in FIG. 3, various lightweight embodiments of the present invention can be used as wearable or handheld equipment for navigational purposes. For example, first responders such as police, fire or military personnel can use the system 100 inside a building that has already been mapped. Locally acquired maps created from data from the system 100 then can be compared in real time with existing global maps to localise and assist the first responder. Similar localisation and mapping functions can be achieved using robots or other vehicles in remote environments such as underground mines or underwater environments.

An example of a registration algorithm that can be used in conjunction with the present invention is provided in the paper by Michael Bosse and Robert Zlot, "Continuous 3D Scan-Matching with a 2D Spinning Laser", Proceedings of the IEEE International Conference on Robotics and Automation, pages 4312-4319, Kobe, Japan, May 12-17, 2009, which paper is incorporated by reference herein in its entirety. A summary of how such a registration algorithm functions is provided below.

For example, considering the system 100 connected to the helmet 300 shown in FIG. 3, as a person wearing the helmet 300 moves, motion is excited through the spring 110. The scanner 105 thus rotates through additional degrees of freedom and a wider field of view, thereby taking measurements outside of a normal 2D scan plane and providing 3D measurements of the surrounding environment. However, the exact nature of the scanner motion may be initially unknown. One can make an estimate of the rotational movement of the scanner 105 using data from the IMU 145, which is rigidly attached to the laser scanner 105; but translational motion may be completely unknown. A registration algorithm can recover the translational motion, apply corrections to a rotational motion estimate, and additionally perform timing synchronization.

Figure 4:
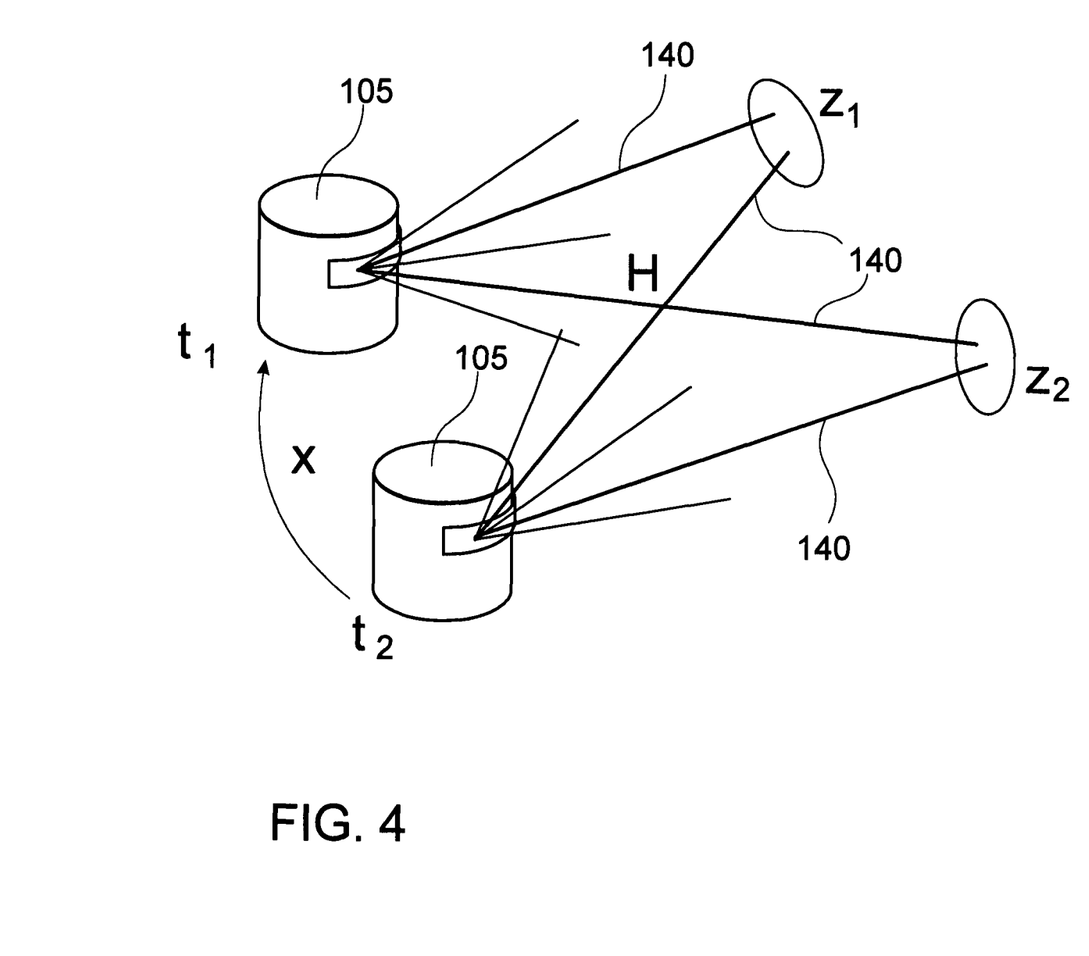
FIG. 4 is a diagram illustrating translational movement of a scanner relative to surfaces in an environment, according to some embodiments of the present invention.

Referring to FIG. 4, a diagram illustrates translational movement of the scanner 105 relative to surfaces $z_1$ and $z_2$ in an environment, according to some embodiments of the present invention. As shown, consider that the scanner 105 is at a first position at time $t_1$ and at a second position at time $t_2$. Prior to processing data obtained by the system 100 using a registration algorithm, the pose (i.e., position and orientation) of the scanner 105 at times $t_1$ and $t_2$ are not known accurately (although some estimates of the positions may be known based on, for example, data from the IMU 145). As illustrated, the surfaces $z_1$ and $z_2$ represent surfaces in an environment that are both measured by beams 140 from the scanner 105 at both the first and second positions. A first step of a registration algorithm is to perform data association that identifies that the scanner 105 is in fact seeing common features at both positions that identify the surfaces $z_1$ and $z_2$. A system of constraints H are then formed that link feature matches to corrections x applied to the pose of the scanner 105. As will be understood by those having ordinary skill in the art, FIG. 4 illustrates only a subset of poses and matches; whereas an actual embodiment will generally consider a longer trajectory of the scanner 105 and a full set of range measurements.

A registration algorithm may use as an input a prior trajectory (e.g., containing only orientation estimates taken from the IMU 145) and a set of range scans. Using the prior trajectory, one can project the scan points (i.e., range measurements) into a non-registered (i.e., generally poorly aligned) 3D point cloud. A trajectory can be defined as a continuous time history of the positions and orientations (in six degrees of freedom (DOF)—three positional and three rotational) of an origin of the scanner 105. Pose is defined in six DOF for a 3D rigid body. Thus a trajectory can be defined as a function $T(\tau)$ specifying a six DOF pose of the scanner 105 with respect to a ground coordinate frame, for each time $\tau$ over the duration of a sweep of the scanner 105.

A workspace of an environment is then discretized into a 3D grid of cells or "voxels" (volume elements), and statistics are computed for each voxel based on the set of scan points that fall within its boundaries. To account for non-uniform sampling of the environment and boundary effects, 3D grids are computed at multiple resolutions and offsets. The statistics computed for a given voxel define an ellipsoid that fits the points using first- and second-order moments $\mu$, S that describe the parameters for an ellipsoid fitting the points $p_i$:

$$\mu = \frac{1}{N}\sum_{i=1}^{N} p_i \qquad \text{(Eq. 1)}$$

$$S = \frac{1}{N}\sum_{i=1}^{N}(p_i p_i^T) - \mu\mu^T \qquad \text{(Eq. 2)}$$

The ellipsoids can be summarized by their centroid (i.e., mean location) and a set of coordinate axes and magnitudes defining the shape (which can be computed by eigenvalue-eigenvector decomposition of the second-order moment matrix S). The shape additionally can be summarized by shape parameters that describe how planar, cylindrical, or spherical the distributions are based on the computed eigenvalues. A plane is further associated with its normal (the eigenvector corresponding to the smallest eigenvalue), while a cylinder can be associated with its axis (the eigenvector corresponding to the largest eigenvalue).

Given sorted eigenvalues $\lambda_1 \leq \lambda_2 \leq \lambda_3$ of the second order moment matrix S, the quantity:

$$c = \frac{\lambda 3 - \lambda 2}{\lambda 1 + \lambda 2 + \lambda 3} \qquad \text{(Eq. 3)}$$

is the cylindrical-likeness of the points which range from 0 to 1. Similarly, the quantity:

$$p = 2\frac{\lambda 2 - \lambda 1}{\lambda 1 + \lambda 2 + \lambda 3} \qquad \text{(Eq. 4)}$$

is the plane-likeness of the points which range from 0 to 1.

An iterative optimization algorithm is then used to estimate the sensor trajectory and register the point cloud to produce an accurate 3D map. On each iteration, an input trajectory estimate is given and further corrected to produce an improved output trajectory estimate, which then can be used as the input for the next iteration. The first iteration uses a prior estimate generated from the rotational motion as estimated by the IMU 145. The registration algorithm can be applied to segments of the trajectory at fixed intervals (e.g., once per second), to register the most recent data as it is acquired from the ranging apparatus and orientation sensor. By accumulating registered trajectory segments in this manner (and maintaining continuity constraints between them) a full trajectory can be obtained piece by piece.

The registration is implemented as a minimization problem with a linear system of constraints. To form such a system, the trajectory must be discretized by sampling it at regular intervals. Interpolation can be used later to form a continuous trajectory given the discrete solution. The optimization solves for corrections to the trajectory, resulting in a smooth trajectory that best explains the range data.

The algorithm operates in sequence on fixed-size, overlapping time segments of a trajectory. For example, a first second of data is processed and then a next second of data (which partially overlaps with the first second of data) is processed.

In each iteration of the registration algorithm, a set of constraints are generated, where each constraint is one of three types. The first type includes smoothness constraints, which incorporate a model of how the scanner 105 (and thus the object to which the scanner 105 is connected) might move based on physical considerations such as a smooth motion assumption, i.e., gradual acceleration limitations. The second type of constraints include initial condition constraints, which ensure that the current trajectory segment is continuous with the previous segment (i.e., the start of the current segment should be constrained to match with the end of the previous segment).

The third type of constraints include match constraints, which take the laser measurements of the external environment into account. Associated pairs of voxels are then identified, which are estimated to be matches originating from the same target in the environment measured at different times. The targets can be for example voxels that are represented by their location and shape parameterization. Such matches generate constraints on trajectory points, so that a trajectory must be constrained in a particular way in order for the particular measurements of the environment to have been obtained at different known times along the trajectory. For example, assume two measurements are made of the same target at different times, but the sensor pose of the scanner 105 at the time of each measurement is not accurately known. An identified voxel match constrains the two sensor poses (relative to one another) since the measured targets should be approximately co-located and aligned; therefore the measurements could not have come from two arbitrarily aligned sensor poses.

The matches are determined using a k-nearest neighbours (kNN) search, which given a point in a space containing a representation of the voxels identifies the k closest points in that space. The space for the kNN search is a 9-dimensional space, which combines the positional and shape information for each voxel. Given these candidate matches, the match constraints can be generated and weighted based on the shape parameters (planarity, cylindrical-ness, spherical-ness). The planar constraints state that the distance between the centroids measured along the plane normal, and the difference in alignment of the normal, should be minimized. The cylindrical constraints state that the distance between the centroids away from the cylinder axis and the difference in alignment of the axes should be minimized. Spherical constraints state that the distance between the centroids should be minimized.

In each iteration, the three types of constraints can be stacked to form a sparse system of linear constraints, which can be defined by a linear system of equations of the form:

$$\begin{bmatrix} A_{match} \\ \hline A_{smooth} \\ \hline A_{initial} \end{bmatrix} \begin{bmatrix} \delta r(\tau_1) \\ \delta t(\tau_1) \\ \vdots \\ \delta r(\tau_n) \\ \delta t(\tau_n) \end{bmatrix} = \begin{bmatrix} b_{match} \\ \hline b_{smooth} \\ \hline b_{initial} \end{bmatrix} \qquad \text{(Eq. 5)}$$

where the δr's and δt's are the trajectory corrections at the sampled times $\tau_1$ through $\tau_n$, and the A submatrices and b vectors represent three types of linear constraints: match constraints, smoothness constraints, and initial conditions.

A robust statistical framework uses weights based on a Cauchy distribution to provide robustness to outliers (e.g., the matches generated above do not all have to be correct). The solution to the linear system is then used as the starting point for the next iteration, where new constraints are formed with the new input trajectory to produce an improved trajectory estimate. The algorithm iterates until a defined tolerance or a maximum number of iterations is reached. High-level pseudo-code defining the algorithm appears as Algorithm 1 in the paper by Bosse et al cited above.

As a further example, an alternative registration algorithm can be described as follows. An alternative registration algorithm can iteratively refine the trajectory of the scanner 105 and surfaces representing the environment to minimize the projection error of the laser measurements of the surfaces. Given a prior trajectory (initially from an orientation sensor such as the IMU 145, and subsequently from the output of the previous iteration), all the laser points are projected into a common world frame.

A virtual 3D grid with a specific resolution (typically 0.5 m×0.5 m×0.5 m) is setup and any laser points falling in the same grid cell are grouped together. An ellipsoid is fit to each group of laser points with sufficient membership. The centroid and the smallest eigenvector of the ellipsoid define an initial plane (surface) estimate for that grid cell. The errors of the points in the group to the surface of the plane (i.e., the distance between each point and the surface) are used to refine the plane's position and orientation as well as the trajectory of the sensor head of the scanner 105.

As described in the Bosse et al paper cited above, the trajectory corrections are modelled by sub-sampling the trajectory, and linearly interpolating the trajectory references between the temporally two nearest trajectory samples. The vector of unknowns (x) is comprised of the union of the trajectory subsample corrections and the surface model corrections. Each trajectory subsample correction has six degrees of freedom (three for translation and three for rotation) whereas the surface corrections have three degrees of freedom: one for translation along the surface normal, and two for rotations on axes perpendicular to the surface normal.

However, unlike the process described in the Bosse et al paper, where each match constraint involves two trajectory references (from each matching ellipsoid), here each constraint involves one trajectory reference and one surface reference. There is one surface constraint for each valid laser point. Smoothness and initial condition constraints can be defined in a similar way to the first method described above. The three types of constraints can be stacked to form a sparse system of linear constraints with a high level structure similar to that defined in Equation 5 above. (A difference is in the form of the $A_{match}$ matrix, and the contents of the x vector.)

The trajectory and surface corrections are solved from the linearised system of constraints in an iterative re-weighted least squares M-estimator framework, where the surface constraints are weighted based on a Cauchy distribution of the residuals r defined as:

$$r = A_{match} x - B_{match} \quad \text{(Eq. 6)}$$

and the weights $w_i$ are based on each residual $r_i$ as follows:

$$w_i = \frac{1}{1 + \frac{r_i^2}{rbar^2}} \quad \text{(Eq. 7)}$$

where rbar is a tunable parameter defining a soft outlier threshold on the error. The M-estimator framework is a standard statistical technique for robustly optimizing constraints in the presence of outliers.

The optimization is terminated when the relative change in the sum of weights is below a threshold or when a fixed number of iterations have been completed. The full resolution trajectory corrections are interpolated from the sub-sampled corrections and the laser points are reprojected for the subsequent iterations and for the final solution.

Figure 5:
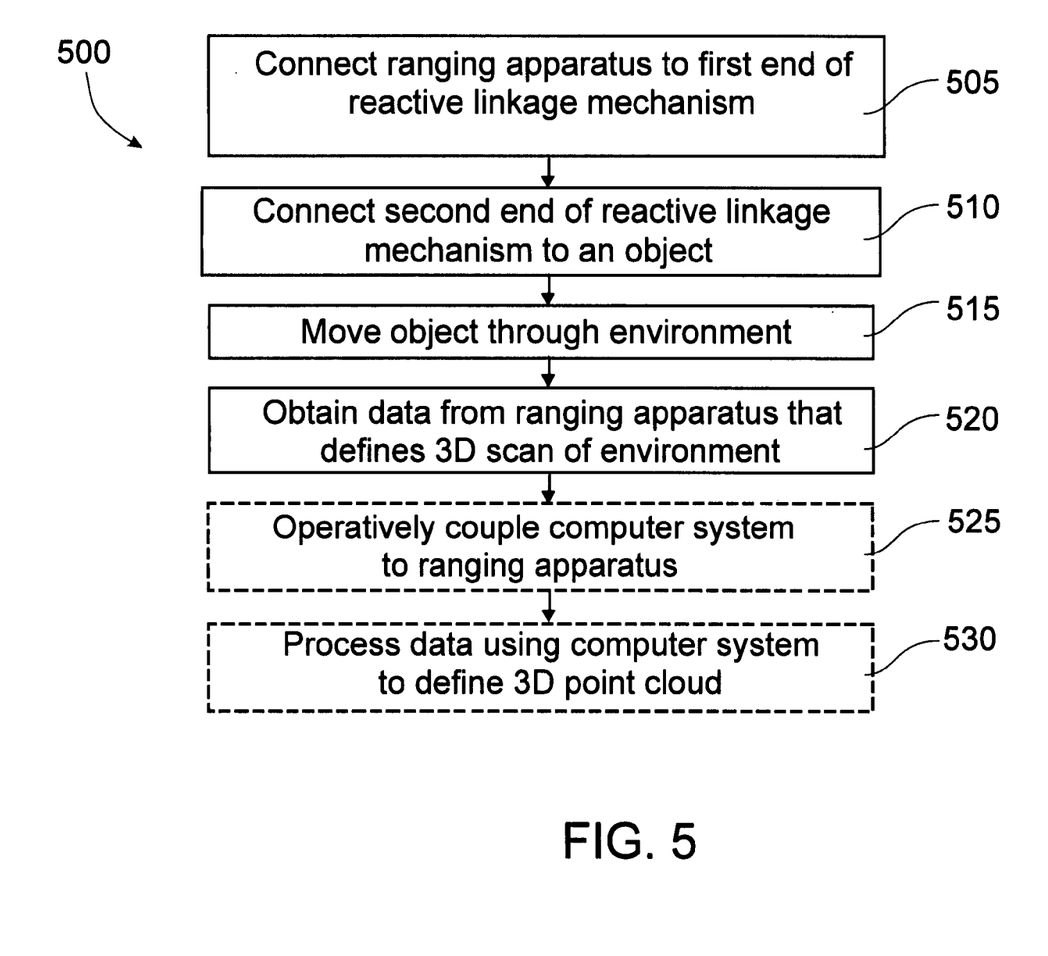
FIG. 5 is a general flow diagram illustrating a method of obtaining a three dimensional scan of an environment, according to an embodiment of the present invention.

Referring to FIG. 5, a general flow diagram illustrates a method of obtaining a three dimensional scan of an environment, according to an embodiment of the present invention. At step 505 a ranging apparatus is connected to a first end of a reactive linkage mechanism. For example, the 2D laser beam scanner 105 is connected to the first end 115 of the coil spring 110.

At step 510, a second end of the reactive linkage mechanism is connected to an object. For example, the second end 120 of the coil spring 110 is connected to the object 125.

At step 515, the object is moved through the environment, whereby acceleration of the object with respect to the environment is converted by the reactive linkage mechanism to motion of the ranging apparatus with respect to the object, which increases the field of view of the ranging apparatus with respect to the environment. For example, translational acceleration illustrated by the arrows 130 is converted by the coil spring 110 into rotational motion of the 2D laser beam scanner 105 as illustrated by the arrows 135.

At step 520, data is obtained by the ranging apparatus that defines the three dimensional scan of the environment. For example, lidar data from the beam 140 is collected from surfaces in the environment.

Optionally, at step 525, a computer system is operatively coupled to the ranging apparatus, wherein the computer system comprises a computer readable medium that stores program code components defining a registration algorithm. For example such a computer system is described in detail below.

Optionally, at step 530, the data is processed using the computer system, whereby the registration algorithm defines a 3D point cloud of the environment.

Figure 6:
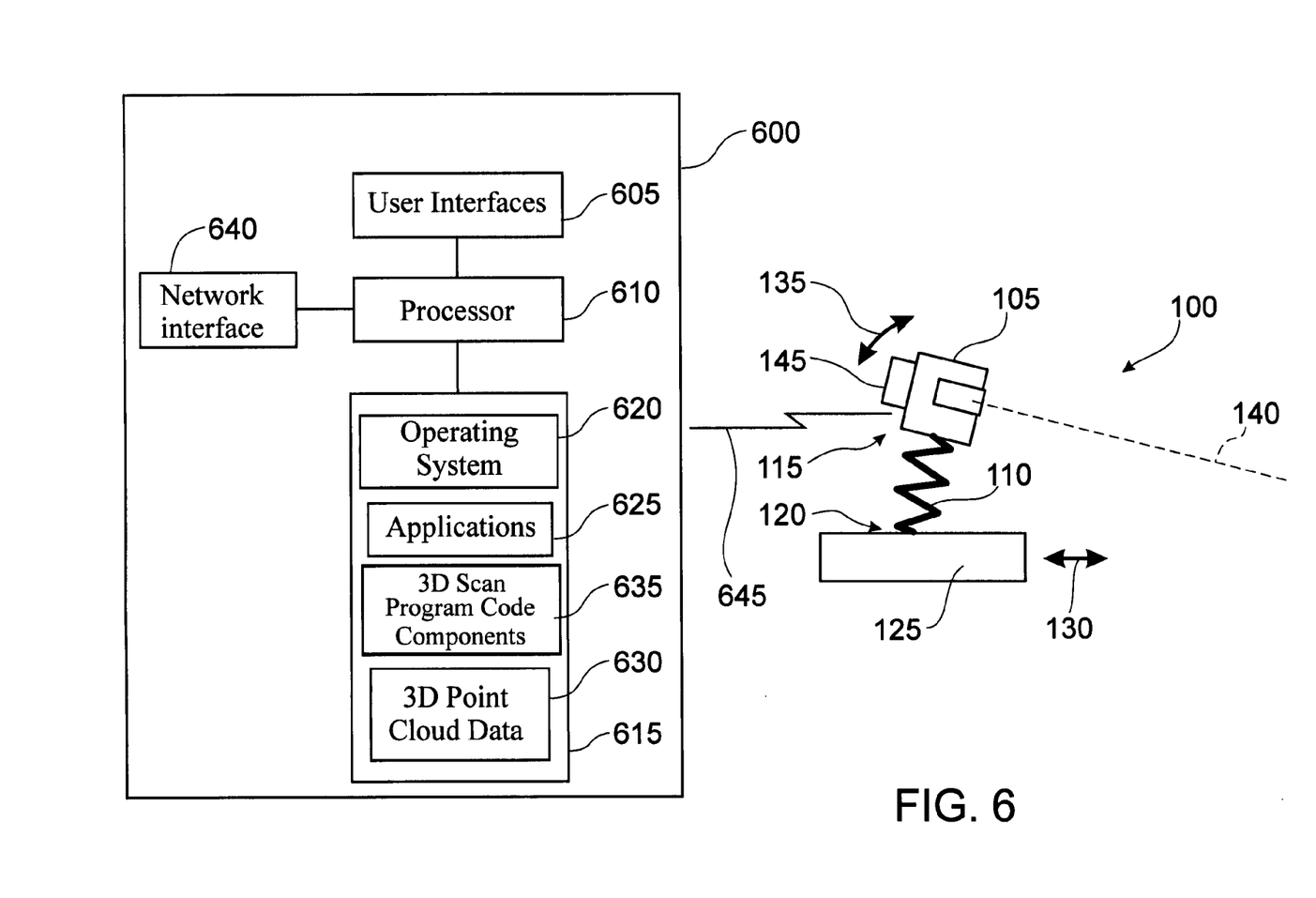
FIG. 6 is a block diagram illustrating components of a system including a computer system for defining a 3D point cloud, according to some embodiments of the present invention.

Referring to FIG. 6, a block diagram illustrates components of a system including a computer system 600 for defining a 3D point cloud, according to some embodiments of the present invention. The computer system 600 comprises user interfaces 605 operatively coupled to at least one processor 610. A memory 615 is also operatively coupled to the processor 610. The memory 615 stores an operating system 620, applications 625 and 3D point cloud data 630. The user interfaces 605 can be a combination of user interfaces including, for example, but not limited to a keypad and a graphical user interface (GUI) such as a computer display screen. A network interface card 640 enables the computer system 600 to be operatively coupled to an electronic communication network such as the Internet, or to the system 100 via a wired or wireless connection 645. It is to be understood that FIG. 6 is for illustrative purposes only and includes only some components of the computer system 600, in accordance with some embodiments of the present invention, and is not intended to be a complete schematic diagram of the various components and connections between components required for all devices that may implement various embodiments of the present invention.

The memory 615 also includes computer readable program code components 635 that define a registration algorithm. For example, when the computer readable program code components 635 are processed by the processor 610, the components 635 are configured to cause execution of step 530 of the method 500 for obtaining a 3D scan of an environment, as described above, according to some embodiments of the present invention.

Figure 7:
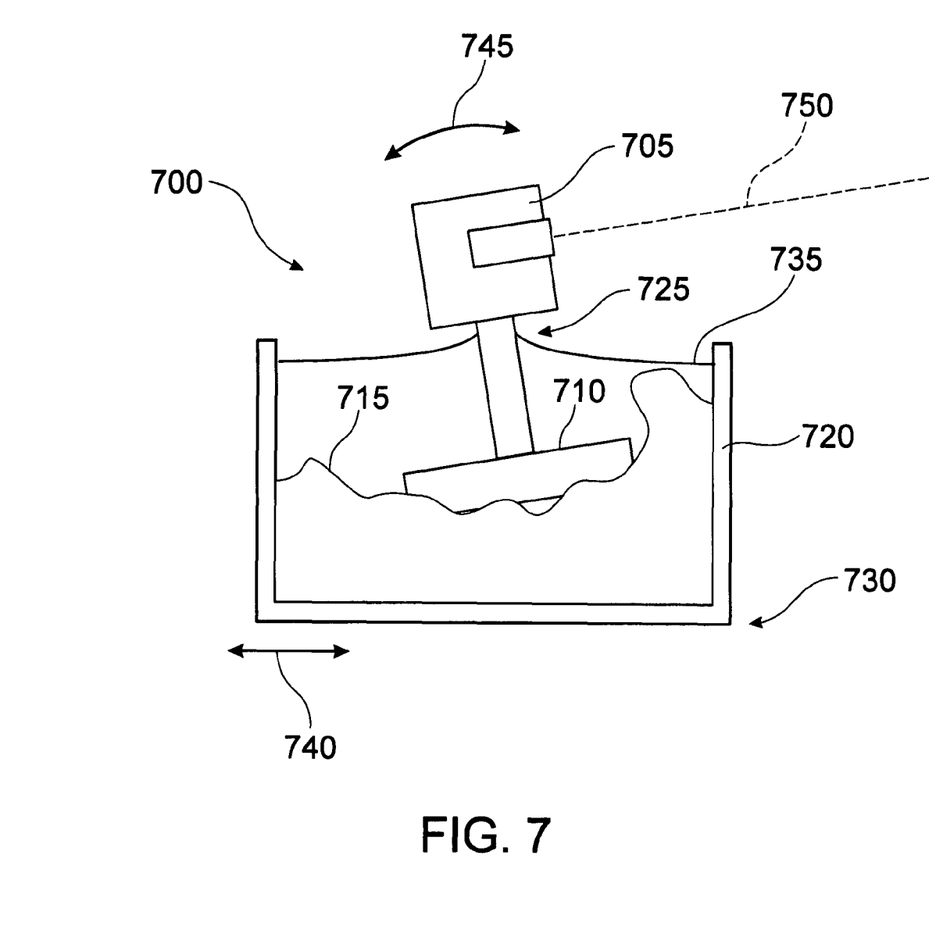
FIG. 7 is a schematic diagram illustrating a side view of a 3D scanning beam system, according to an alternative embodiment of the present invention.

Referring to FIG. 7, a schematic diagram illustrates a partial cutaway side view of a 3D scanning beam system 700, according to an alternative embodiment of the present invention. The system 700 includes a ranging apparatus in the form of a 2D laser beam scanner 705, and a reactive linkage mechanism in the form of a float 710, a fluid 715, and a base 720. A first end 725 (in the form of a top end of the float 710) of the reactive linkage mechanism is connected to the 2D laser beam scanner 705. A second end 730 (in the form of the base 720) of the reactive linkage mechanism is connected to an object (not shown). A cover 735, such as an elastic membrane, can be used to both retain the fluid 715 inside the base 720, and anchor the float 710 in a centre of the base 720.

As with the non-fluidic reactive linkage mechanisms described previously, according to the system 700 translational acceleration of the object (as illustrated by the arrows 740) is converted by the reactive linkage mechanism to rotational motion of the 2D laser beam scanner 105 (as illustrated by the arrows 745). A fluidic coupling between the base 720 and the scanner 705 therefore can provide an intended excitation of motion of the scanner 705 in multiple degrees of freedom. As will be understood by those having ordinary skill in the art, other accelerations of the base 720, including accelerations caused by up and down forces and twisting or turning torques, will also induce "sloshing" of the fluid 715 inside the base 720, and hence induce widely varied and quasi-random 3D motion of the scanner 105. Such 3D motion of the scanner 105, and an associated beam 750, then can be used to scan an environment.

It will be apparent to a person skilled in the art that some steps of methods of the present invention can be implemented in computer program code and that a variety of programming languages and coding implementations may be used to implement the methods described herein. Moreover, computer programs included in the software are not intended to be limited to the specific control flows described herein, and one or more of the steps of the computer programs may be performed in parallel or sequentially. One or more of the operations described in the context of a computer-program-controlled implementation could alternatively be implemented as a hardware electronics component.

In summary, embodiments of the present invention can be used in various applications, including robotics, surveying, gaming, vehicle safety, object modelling, rock and soil analysis applications using ground penetrating radar, and first responder applications. Using systems of the present invention, functions such as mapping and/or localization, object detection, and imaging can be performed significantly more economically and efficiently.

The above description of various embodiments of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. Accordingly, this patent specification is intended to embrace all alternatives, modifications and variations of the present invention that have been discussed herein, and other embodiments that fall within the spirit and scope of the above described invention.

Limitations in the claims should be interpreted broadly based on the language used in the claims, and such limitations should not be limited to specific examples described herein. In this specification, the terminology "present invention" is used as a reference to one or more aspects within the present disclosure. The terminology "present invention" should not be improperly interpreted as an identification of critical elements, should not be improperly interpreted as applying to all aspects and embodiments, and should not be improperly interpreted as limiting the scope of the claims.

The invention claimed is:

1. A three dimensional scanning beam system comprising:
a ranging apparatus; and
a reactive linkage mechanism having a first end and a second end, the first end connected to the ranging apparatus and the second end connected to an object that moves the system by translational motion through an environment;
whereby in use acceleration of the object with respect to the environment is converted by the reactive linkage mechanism to motion of the ranging apparatus with respect to the object, which increases a field of view of the ranging apparatus with respect to the environment.

2. The system of claim 1, further comprising an orientation sensor attached to the ranging apparatus.

3. The system of claim 1, further comprising a computer system operatively coupled to the ranging apparatus, wherein the computer comprises a computer readable medium that stores program code components defining a registration algorithm, and wherein the registration algorithm processes data from the ranging apparatus to define a 3D point cloud of the environment.

4. The system of claim 1, wherein the ranging apparatus comprises a laser.

5. The system of claim 4, wherein the laser comprises a two dimensional scanning beam laser.

6. The system of claim 3, wherein the 3D point cloud is defined in real time.

7. The system of claim 1, wherein the ranging apparatus transmits and receives at least one of the following types of signals: light signals, acoustic signals, ultrasonic signals, radio frequency signals, gamma radiation signals, microwave signals.

8. The system of claim 1, wherein the reactive linkage mechanism comprises a spring.

9. The system of claim 2, wherein the orientation sensor comprises an inertial measurement unit (IMU).

10. The system of claim 1, wherein a connection between the first end of the reactive linkage mechanism and the ranging apparatus is a fluidic coupling.

11. A method for obtaining a three dimensional scan of an environment, the method comprising:
connecting a ranging apparatus to a first end of a reactive linkage mechanism;
connecting a second end of the reactive linkage mechanism to an object;
moving the object through the environment using translational motion, whereby acceleration of the object is converted by the reactive linkage mechanism to motion of the ranging apparatus with respect to the object, which increases the field of view of the ranging apparatus with respect to the environment; and obtaining data by the ranging apparatus that defines the three dimensional scan of the environment.

12. The method of claim 11, wherein an orientation sensor is attached to the ranging apparatus.

13. The method of claim 11, further comprising:

operatively coupling a computer system to the ranging apparatus, wherein the computer system comprises a computer readable medium that stores 5 program code components defining a registration algorithm; and processing the data using the computer system, whereby the registration algorithm defines a 30 point cloud of the environment.

14. The method of claim 11, wherein the ranging apparatus comprises a laser.

15. The method of claim 14, wherein the laser comprises a two dimensional scanning beam laser.

16. The method of claim 13, wherein the 30 point cloud is defined in real time.

17. The method of claim 11, wherein the ranging apparatus transmits and receives at least one of the following types of signals: light signals, acoustic signals, ultrasonic signals, radio frequency signals, gamma radiation signals, microwave signals.

18. The method of claim 11, wherein the reactive linkage mechanism comprises a spring.

19. The method of claim 12, wherein the orientation sensor comprises an inertial measurement unit (IMU).

20. The method of claim 11, wherein the reactive linkage mechanism comprises a fluidic coupling.

* * * * *